US008717030B2

(12) United States Patent
Cobo et al.

(10) Patent No.: US 8,717,030 B2
(45) **Date of Patent: *May 6, 2014**

(54) CONTROLLING ELECTROMAGNETIC RADIATION IN A DATA CENTER

(75) Inventors: Milton Cobo, Raleigh, NC (US); James E. Hughes, Apex, NC (US); Thomas D. Pahel, Jr., Raleigh, NC (US); Pravin S. Patel, Cary, NC (US); Challis L. Purrington, Raleigh, NC (US); Jack P. Wong, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 688 days.

This patent is subject to a terminal disclaimer.

(21) Appl. No.: 12/948,851

(22) Filed: Nov. 18, 2010

(65) Prior Publication Data

US 2012/0126149 A1 May 24, 2012

(51) Int. Cl.
*G01V 3/02* (2006.01)

(52) U.S. Cl.
USPC .......................................................... 324/357

(58) Field of Classification Search
None
See application file for complete search history.

(56) References Cited

U.S. PATENT DOCUMENTS

| | | | | |
|---|---|---|---|---|
| 4,948,922 | A | 8/1990 | Varadan et al. | |
| 6,559,903 | B2 | 5/2003 | Faris et al. | |
| 2003/0038745 | A1* | 2/2003 | Lalezari et al. | 342/368 |
| 2007/0063907 | A1 | 3/2007 | Hatakeyama et al. | |
| 2012/0235068 | A1* | 9/2012 | Cobo et al. | 250/505.1 |

FOREIGN PATENT DOCUMENTS

| | | |
|---|---|---|
| JP | 2000-059068 | 2/2000 |
| JP | 2000-332484 | 11/2000 |
| JP | 2001-339191 | 12/2001 |
| JP | 2001-339192 | 12/2001 |
| JP | 2003-234593 | 8/2003 |
| JP | 2004-363138 | 12/2004 |
| JP | 2004-363159 | 12/2004 |
| JP | 2005-079247 | 3/2005 |
| JP | 2005-158851 | 6/2005 |
| JP | 2005-183772 | 7/2005 |

OTHER PUBLICATIONS

Parker, et al., Active Frequency Selective Surfaces With Ferroelectric Substrates, Microwaves, Antennas and Propagation, IEE Proceedings, Apr. 2001, pp. 103-108, vol. 148, Issue No. 2, University of Kent, Canterbury.

Park, et al., Development of Electromagnetic Wave Absorbers to Improve ETC Communication Environment, Microwave Conference, Department of Radio Sciences and Engineering, Korea Maritime University, 2008, Korea.

(Continued)

*Primary Examiner* — Melissa Koval
*Assistant Examiner* — Trung Nguyen
(74) *Attorney, Agent, or Firm* — Brandon C. Kennedy; Katherine S. Brown; Biggers Kennedy Lenart Spraggins LLP

(57) ABSTRACT

Controlling electromagnetic ('EM') radiation in a data center having a number EM sections, including: receiving, by an EM controller, a specification of preferred EM radiation characteristics for the data center; and setting, by the EM controller, a state of each EM section in accordance with the specification, where the state of each EM section may be one of: an absorption state in which the EM section absorbs EM radiation or a reflection state in which the EM section reflects EM radiation.

4 Claims, 4 Drawing Sheets

(56) References Cited

OTHER PUBLICATIONS

Smith, et al., Principles and Demonstration of Multi-Functional Adaptive Electromagnetic Screen, Electronic Letters, Jun. 26, 2003, vol. 39, No. 13.

Bossard, et al., A Novel Design Methodology for Reconfigurable Frequency Selective Surfaces Using Genetic Algorithms, Antennas and Propagation, IEEE Transactions, 2001, pp. 1390-1400, vol. 53, Issue 4.

* cited by examiner

CONTROLLING ELECTROMAGNETIC RADIATION IN A DATA CENTER

BACKGROUND OF THE INVENTION

1. Field of the Invention

The field of the invention is data processing, or, more specifically, methods, apparatus, and products for controlling electromagnetic radiation in a data center.

2. Description of Related Art

Today, large numbers of computer systems are often grouped physically in a data center to provide multiple services from a central location. Such computer systems often communicate with one another via wireless data communications formed by electromagnetic radiation. Electromagnetic radiation, however, in today's data centers is often blocked, redirected, or otherwise inhibited. As such, wireless data communications among computer systems or other devices in the data center may be inhibited.

SUMMARY OF THE INVENTION

Methods, apparatus, and products for controlling electromagnetic ('EM') radiation in a data center are disclosed. In addition, data centers in which such EM radiation is controlled are also disclosed. Such data centers include a plurality of EM sections. Controlling EM radiation in a data center in accordance with embodiments of the present invention includes: receiving, by an EM controller, a specification of preferred EM radiation characteristics for the data center and setting, by the EM controller, a state of each EM section in accordance with the specification, wherein the state of each EM section comprises one of: an absorption state in which the EM section absorbs EM radiation or a reflection state in which the EM section reflects EM radiation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
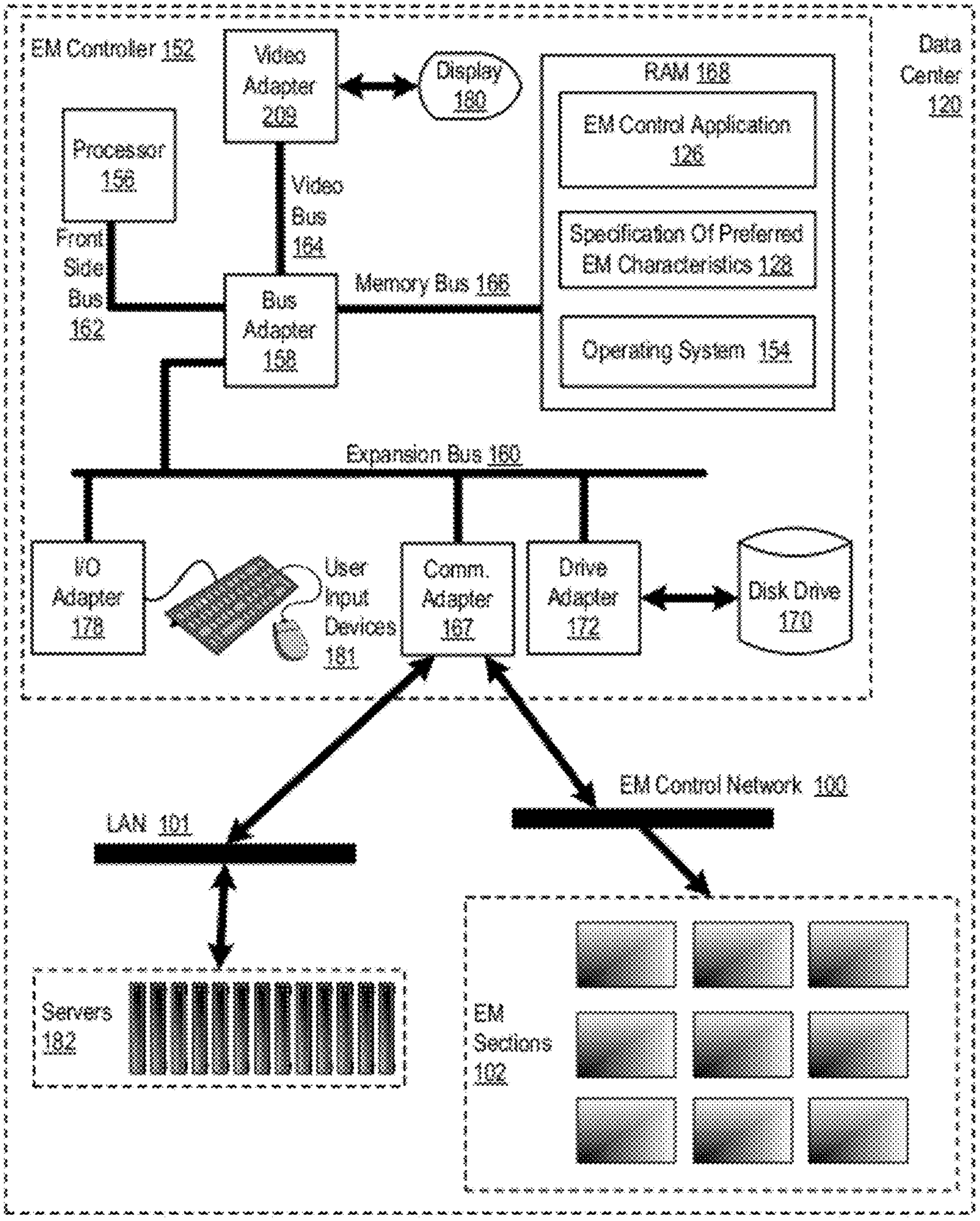
FIG. 1 sets forth a network diagram of an exemplary data center in which EM radiation is controlled according to embodiments of the present invention.

Exemplary methods, apparatus, and products for controlling EM radiation in a data center in accordance with the present invention are described with reference to the accompanying drawings, beginning with FIG. 1. FIG. 1 sets forth a network diagram of an exemplary data center in which EM radiation is controlled according to embodiments of the present invention. A data center is a facility used to house mission critical computer systems and associated components. Such a data center may include environmental controls (air conditioning, fire suppression, etc.), redundant or backup power supplies, redundant data communications connections, and high security, highlighted by biometric access controls to compartmentalized security zones within the facility. A data center may also house a large amount of electronic equipment, typically computers and communications equipment. A data center may be maintained by an organization for the purpose of handling the data necessary for its operations. A bank, for example, may have a data center, where all bank customers' account information is maintained and transactions involving these accounts are carried out. Practically every company that is mid-sized or larger has some kind of data center with the larger companies often having dozens of data centers.

The data center (120) of FIG. 1 includes an a plurality of EM sections (102), an EM controller (152), and a number of servers (182). An EM section is a device, which may be installed in a data center and operates to either absorb EM radiation or reflect EM radiation. EM sections may be implemented in various ways, including, for purposes of explanation only, as a sheet of conductive metal. Such sheets of conductive metal may be installed in ceilings, walls, and floors of the data center in a grid (or other) pattern. In data centers having a raised floor, EM sections may be installed underneath the floor upon which people may walk. Each EM section (102) in the example data center (120) of FIG. 1 is configurable. That is, each EM section may be set to one of two states: an absorption state in which the EM section absorbs EM radiation or a reflection state in which the EM section reflects EM radiation.

The EM controller (152) in the example of FIG. 1 is automated computing machinery—a computer—that operates generally for controlling EM radiation in a data center in accordance with embodiments of the present invention. The EM controller (152) of FIG. 1 includes at least one computer processor (156) or 'CPU' as well as random access memory (168) ('RAM') which is connected through a high speed memory bus (166) and bus adapter (158) to processor (156) and to other components of the EM controller (152).

Stored in RAM (168) is an EM control application (126), a module of computer program instructions that, when executed by the processor (156) of the EM controller (152) causes the EM controller to: receive a specification (128) of preferred EM radiation characteristics for the data center and set a state of each EM section in accordance with the specification. In the example data center (120) of FIG. 1, each EM section may be set to one of two states: an absorption state in which the EM section absorbs EM radiation or a reflection state in which the EM section reflects EM radiation. An EM controller may receive the preferred characteristics in various ways, including for example, by receiving the characteristics directly from a system administrator or other user, by receiving the characteristics in directly from an application specifying locations of wireless communicators, or in other ways as will occur to readers of skill in the art. Such preferences may specify explicitly those EM sections (102) to set to a particular state, or instead, may specify an objective EM path from which the EM controller may identify EM sections to set a particular state. By selectively setting EM sections to absorb or reflect radiation, the EM control may effectively tune the data center for wireless data communications among devices—servers (182) for example—in the data center.

The EM controller is coupled for data communications to the EM sections (102) in the example of FIG. 1 through an EM control network (100). The EM control network (100)

may be implemented in myriad ways: as an Ethernet network with switches and hubs, as a point-to-point network, as an $I^2C$ network, with a multiplexor capable of coupling a single EM section to the EM controller for communications, or in other ways as will occur to readers of skill in the art.

Also stored in RAM (168) is an operating system (154). Operating systems useful for controlling EM radiation in a data center according to embodiments of the present invention include UNIX™, Linux™, Microsoft XP™, AIX™, IBM's i5/OS™ and others as will occur to those of skill in the art. The operating system (154), EM control application (126), and the specification of preferred EM characteristics (128) in the example of FIG. 1 are shown in RAM (168), but many components of such software typically are stored in non-volatile memory also, such as, for example, on a disk drive (170).

The EM controller (152) of FIG. 1 includes disk drive adapter (172) coupled through expansion bus (160) and bus adapter (158) to processor (156) and other components of the EM controller (152). Disk drive adapter (172) connects non-volatile data storage to the EM controller (152) in the form of disk drive (170). Disk drive adapters useful in EM controllers that control EM radiation in a data center according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example EM controller (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example EM controller (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary EM controller (152) of FIG. 1 includes a communications adapter (167) for data communications with other computers—servers (182)—and for data communications with a local data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in EM controllers that control EM radiation according to embodiments of the present invention include modems for wired dial-up communications, Ethernet (IEEE 802.3) adapters for wired data communications network communications, and 802.11 adapters for wireless data communications network communications.

The arrangement of EM controllers, servers, EM sections, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
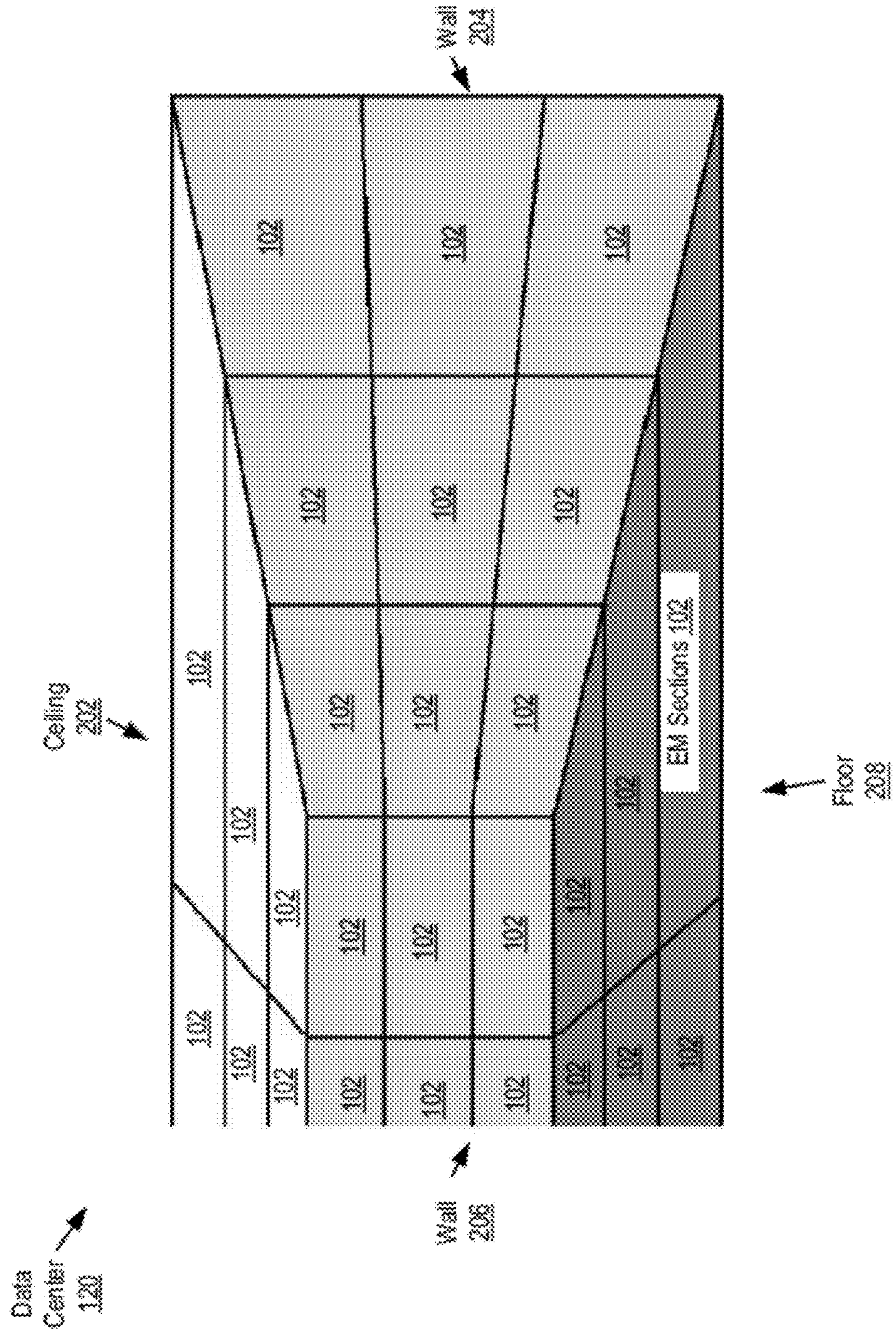
FIG. 2 sets forth a line drawing of an exemplary data center in which EM radiation is controlled in accordance with embodiments of the present invention.

For further explanation, FIG. 2 sets forth a line drawing of an exemplary data center in which EM radiation is controlled in accordance with embodiments of the present invention. The example data center (120) of FIG. 2 includes a plurality of EM sections (102). In the example data center (120) of FIG. 2, EM sections (102) have been installed in two walls (204, 206), a ceiling (202), and a floor (206). In such a data center, an EM controller (not shown here, but similar to the EM controller (120) on FIG. 1), may receive a specification of preferred EM characteristics in the data center and set each a state of each the EM sections (102) to one of an absorption state or reflective state. Consider, for example, a specification of preferred EM characteristics that specifies EM radiation to be received by devices near the floor (208) and wall (204) but not by devices near the middle or top of the wall (204). In such an example, the EM controller may set the row of EM sections (102) installed in the wall (204) and nearest the floor (208) to a reflective state while setting the remaining two rows of EM sections (102) installed in the wall (204) to an absorption state. Readers of skill in the art will recognize that there may be many different configurations of EM sections installed in a data center and such EM sections may be set to absorb or reflect EM radiations in various ways. Each such configuration and way is well within the scope of the present invention.

Figure 3:
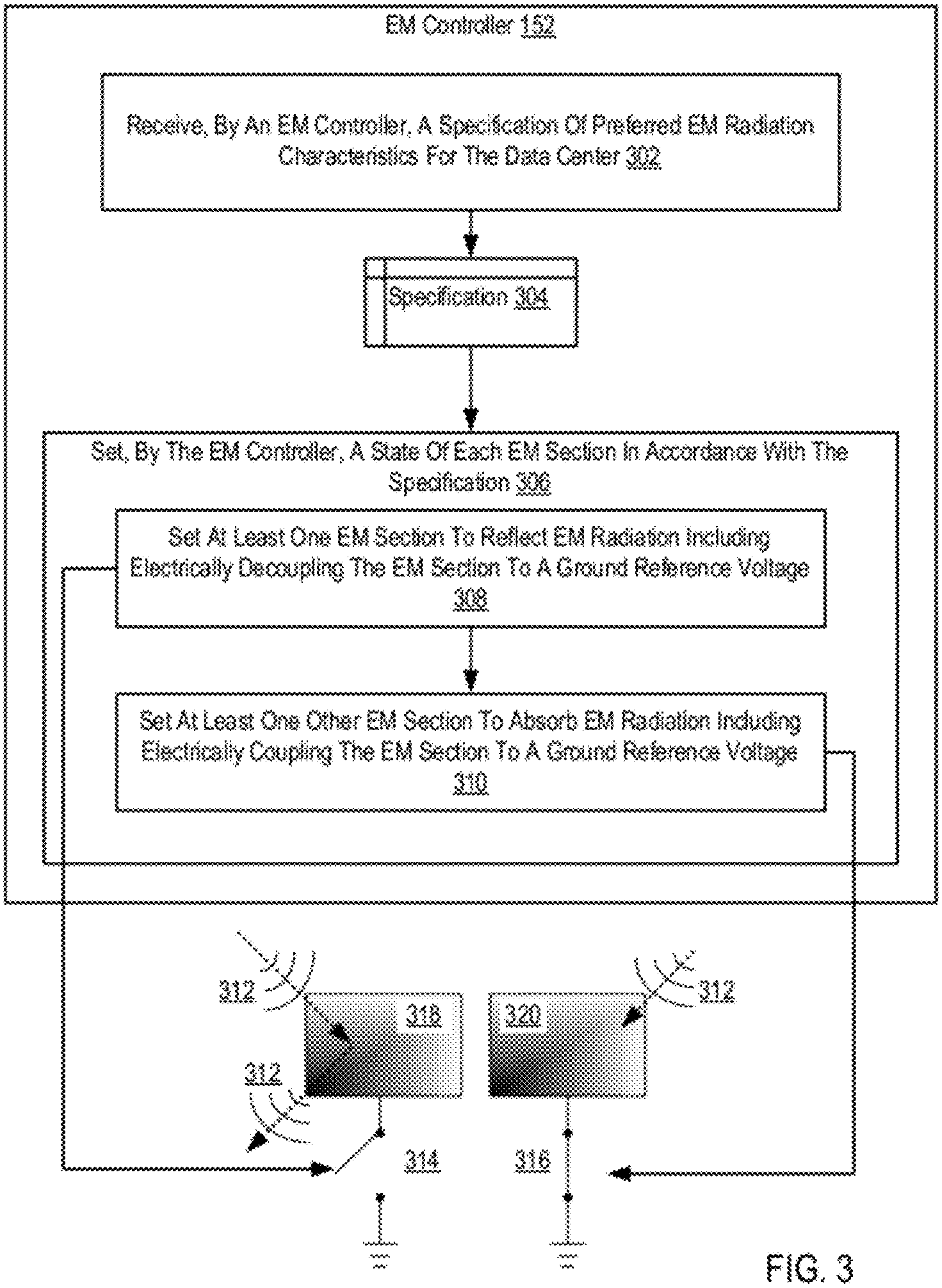
FIG. 3 sets forth a flow chart illustrating an exemplary method for controlling EM radiation in a data center according to embodiments of the present invention.

For further explanation, FIG. 3 sets forth a flow chart illustrating an exemplary method for controlling EM radiation in a data center according to embodiments of the present invention. In the method of FIG. 3, the data center includes a plurality of EM sections. The method of claim 3 includes receiving (302), by an EM controller (152), a specification (304) of preferred EM radiation characteristics for the data center. A specification (304) of preferred EM radiation characteristics may be implemented in various ways including for example, as a message from a administration module configured to administer computing devices in the data center, as a data structure received in response to user input specifying the preferred characteristics, and in other ways as will occur to readers of skill in the art.

The method of FIG. 3 also includes setting (306), by the EM controller, a state of each EM section in accordance with the specification. In the example of FIG. 3, the state of each EM section may be set (306) to one of: an absorption state in which the EM section absorbs EM radiation or a reflection state in which the EM section reflects EM radiation. In the method of FIG. 3, each EM section (318, 320), is implemented as an electrically conductive metal and setting (306) a state of each EM section (318, 320), is carried out by setting (308) at least one EM section to reflect EM radiation (312) including electrically decoupling (314) the EM section to a ground reference voltage; and setting (320) at least one other EM section to absorb EM radiation (312) including electrically coupling (316) the EM section to a ground reference voltage.

Figure 4:
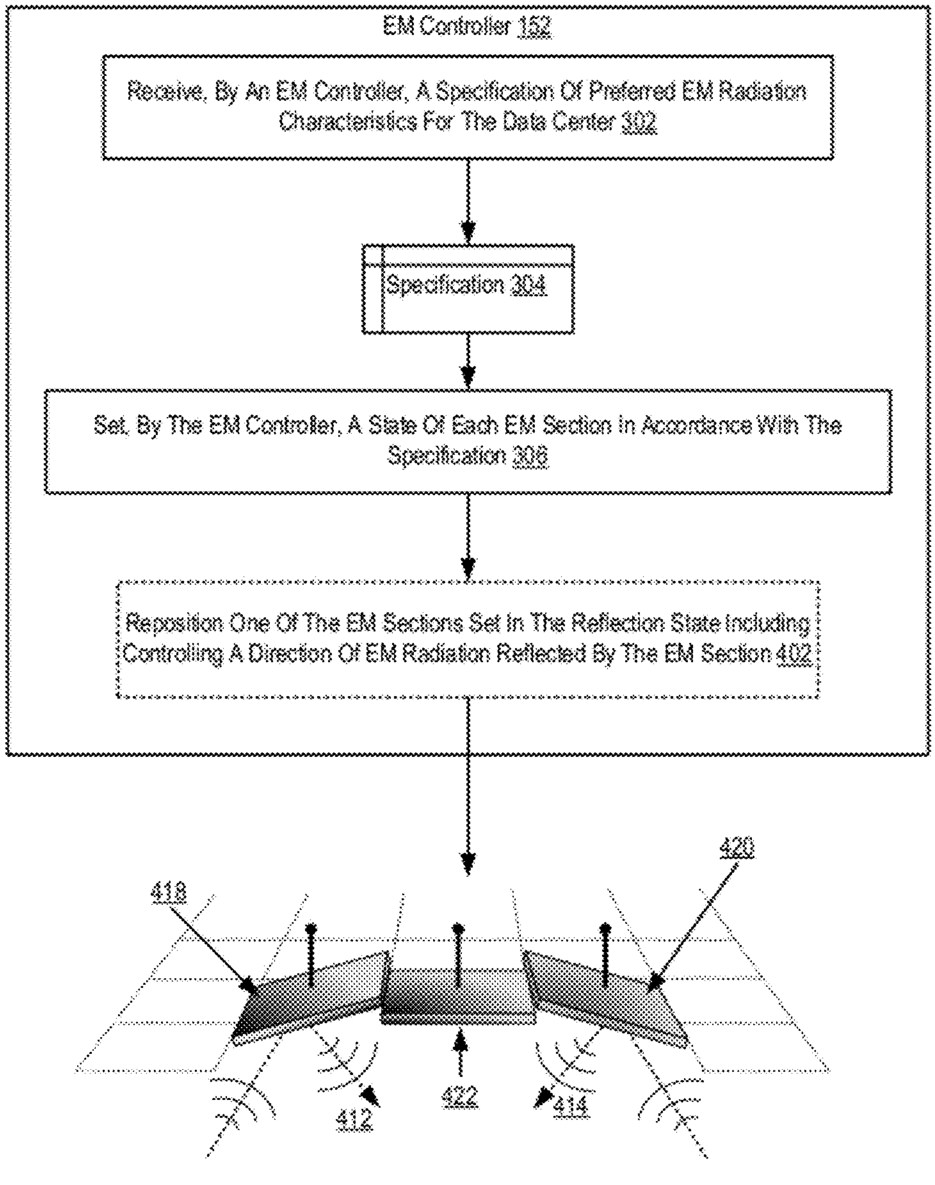
FIG. 4 sets forth a flow chart illustrating a further exemplary method of controlling EM radiation in a data center according to embodiments of the present invention.

For further explanation, FIG. 4 sets forth a flow chart illustrating a further exemplary method of controlling EM radiation in a data center according to embodiments of the present invention, where the data center includes a plurality of EM sections. The method of FIG. 4 is similar to the method of FIG. 3 in that the method of FIG. 4 includes receiving (302) a specification (304) of preferred EM radiation characteristics for the data center and setting (306) a state of each EM section in accordance with the specification.

The method of FIG. 4 differs from the method of FIG. 3, however, in that, the method of FIG. 4 includes, repositioning (402) an EM section (418, 420) set in the reflection state including controlling a direction of EM radiation (412, 414) reflected by the EM section. Repositioning (402) an EM section set in the reflection state. In the example of FIG. 4, three EM sections (412, 422, and 414) installed in a ceiling of a data center are set forth for purposes of explanation. EM section (418) and EM section (420) are repositioned to control direction of reflection of EM radiation (412) and EM radiation (414) respectively, while EM section (422) remains in its original position. EM sections may be repositioned (402) in various ways, including, for example by use of one or more motors, such as a stepper motor, coupled to a central axis point of the EM section. In this way, an EM section may be rotated about the section point at a multitude of different angles and the EM section's position may be precisely set.

Exemplary embodiments of the present invention are described largely in the context of a fully functional computer system for controlling EM radiation in a data center. Readers of skill in the art will recognize, however, that the present invention also may be embodied in a computer program product disposed upon computer readable media for use with any suitable data processing system. Such computer readable media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A data center in which electromagnetic ('EM') radiation is controlled, the data center comprising:

a plurality of EM sections, wherein each EM section comprises an electrically conductive metal; and an EM controller configured to carry out the steps of:

receiving a specification of preferred EM radiation characteristics for the data center; and setting a state of each EM section in accordance with the specification by setting at least one EM section to reflect EM radiation including electrically decoupling the EM section to a ground reference voltage and setting at least one other EM section to absorb EM radiation including electrically coupling the EM section to a ground reference voltage, wherein the state of each EM section comprises one of: an absorption state in which the EM section absorbs EM radiation or a reflection state in which the EM section reflects EM radiation.

2. The data center of claim 1, wherein the EM controller is further configured to carry out the step of repositioning one of the EM sections set in the reflection state including controlling a direction of EM radiation reflected by the EM section.

3. The data center of claim 1, further comprising one or more walls, a ceiling, and a floor; wherein each wall comprises one or more EM sections, the ceiling comprises one or more EM sections, and the floor comprises one or more EM sections.

4. The data center of claim 1, wherein at least a portion of the EM radiation controlled in the data center comprises wireless data communications.

* * * * *